(12) United States Patent
Wang (10) Patent No.: US 11,405,936 B2
(45) Date of Patent: Aug. 2, 2022

(54) SCHEDULING TIMING DETERMINATION METHOD, TERMINAL AND NETWORK SIDE DEVICE

(71) Applicant: DATANG MOBILE COMMUNICATIONS EQUIPMENT CO., LTD., Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/431,401

(22) PCT Filed: Feb. 14, 2020

(86) PCT No.: PCT/CN2020/075233
§ 371 (c)(1),
(2) Date: Aug. 16, 2021

(87) PCT Pub. No.: WO2020/164578
PCT Pub. Date: Aug. 20, 2020

(65) Prior Publication Data
US 2022/0046655 A1    Feb. 10, 2022

(30) Foreign Application Priority Data

Feb. 15, 2019 (CN) .......................... 201910117796.1

(51) Int. Cl.
*H04W 72/12* (2009.01)
(52) U.S. Cl.
CPC ................. *H04W 72/1205* (2013.01)
(58) Field of Classification Search
CPC ...................... H04W 72/12; H04W 74/002
See application file for complete search history.

(56) References Cited

U.S. PATENT DOCUMENTS

2019/0007152 A1\* 1/2019 Yi .......................... H04L 5/0028
2019/0254061 A1\* 8/2019 Manolakos ........... H04L 5/0048
(Continued)

FOREIGN PATENT DOCUMENTS

| CN | 108377556 A | 8/2018 |
| CN | 108989007 A | 12/2018 |
| WO | WO 2017/209585 A1 | 12/2017 |

OTHER PUBLICATIONS

CMCC, "Discussion on cross-carrier scheduling with different numerologies," R1-1900426, 3GPP TSG RAN WG1 Ad-Hoc Meeting 1901, dated Jan. 21-25, 2019, indicated as published on Jan. 12, 2019 in PCT International Search Report, entire document.

(Continued)

*Primary Examiner* — Romani Ohri
(74) *Attorney, Agent, or Firm* — Ladas & Parry, LLP (57) ABSTRACT

A scheduling timing determination method, a terminal and a network side device are provided. The method includes: receiving scheduling information of a network side device carried by a control channel on a scheduling carrier, obtaining a slot offset between the control channel and a data channel according to the scheduling information; determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point; determining a transmission slot of the data channel on the scheduled carrier according to the relative slot.

20 Claims, 5 Drawing Sheets

(56) References Cited

U.S. PATENT DOCUMENTS

2020/0107299 A1* 4/2020 Zhou .................. H04W 56/005
2020/0235891 A1* 7/2020 Lei ....................... H04L 1/1822

OTHER PUBLICATIONS

CATT, "Discussion on cross-carrier scheduling with different numerologies," R1-1901987, 3GPP TSG RAN WG1 Meeting #96, dated Feb. 25-Mar. 1, 2019, indicated as published on Feb. 16, 2019 in PCT International Search Report, entire document.
International Search Report and Written Opinion issued with respect to International Application No. PCT/CN2020/075233 dated Apr. 29, 2020.
Extended European Search Report for European Patent Application 20755473.4, dated Mar. 25, 2022.
"Support of cross-carrier scheduling with mix numerologies," 3GPP TSG RAN WG1, Ad-Hoc Meeting, 1901, R1-1900155, Taipei, Jan. 21- 25, 2019, Source: vivo, Agenda Item: 7.2.13.2.
"On cross-carrier scheduling with mixed numerologies," 3GPP TSG RAN WG1 Meeting AH-1901, R1-1901119, Taipei, Taiwan, Jan. 21-25, 2019, Source: Nokia, Nokia Shanghai Bell, Agenda item: 7.2.13.4.
"Feature lead summary on Cross-carrier Scheduling with Different Numerologies," 3GPP TSG RAN WG1, Ad-Hoc Meeting 1901, R1-1901458, Taipei, Taiwan, Jan. 21-25, 2019, Source: Nokia, Nokia Shanghai Bell, Agenda item: 7.2.13.2.

\* cited by examiner

SCHEDULING TIMING DETERMINATION METHOD, TERMINAL AND NETWORK SIDE DEVICE

CROSS-REFERENCE TO RELATED APPLICATIONS

This application is the U.S. national phase of PCT Application No. PCT/CN2020/075233 filed on Feb. 14, 2020, which claims priority to Chinese Patent Application No. 201910117796.1 filed on Feb. 15, 2019, the disclosures of which are incorporated in their entireties by reference herein.

TECHNICAL FIELD

The present disclosure relates to the technical field of communication applications, and in particular, to a scheduling timing determination method, a terminal and a network side device.

BACKGROUND

In a current communication system, for an inter-carrier scheduling scenario where a scheduling carrier and a scheduled carrier have different subcarrier spacings, a slot (slot) index of a data channel transmitted on the scheduled carrier is determined by a formula $$\left\lfloor n \cdot \frac{2^{\mu PDSCH}}{2^{\mu PDCCH}} \right\rfloor + K_0.$$

It can be seen that a timing relationship between a control channel and a data channel is determined by a slot (slot) index n of a downlink control channel transmitted on the scheduling carrier, subcarrier spacings of the scheduled carrier and the scheduling carrier, and slot offset $K_0$ between the control channel and the data channel carried in DCI (Downlink Control Information).

However, when the scheduling carrier has a smaller subcarrier spacing and the scheduled carrier has a larger subcarrier spacing, in accordance with the above-mentioned timing determination method, that is $$\left\lfloor n \cdot \frac{2^{\mu PDSCH}}{2^{\mu PDCCH}} \right\rfloor + K_0,$$

the control channel lags behind the data channel. As a result, a terminal side needs to have a larger storage capacity, delay increases and scheduling flexibility is limited.

SUMMARY

Embodiments of the present disclosure provide a scheduling timing determination method, a terminal and a network side device to solve the problem that a timing confirmation method in the related art may cause an increase in scheduling delay, and a terminal side needs to have larger storage capacity and scheduling flexibility is limited.

In order to achieve the above object, the embodiments of the present disclosure provide a scheduling timing determination method, applied to a terminal, including:

receiving scheduling information of a network side device carried by a control channel on a scheduling carrier, and obtaining a slot offset between the control channel and a data channel according to the scheduling information;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Optionally, the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, includes:

receiving configuration information sent by the network side device;

obtaining the subcarrier spacing of the scheduling carrier and the subcarrier spacing of the scheduled carrier according to the configuration information.

Optionally, the relative slot $K_{slot}=\lfloor((2^{\mu scheduled}/2^{\mu scheduling})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu scheduled}/2^{\mu scheduling})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a scheduling timing determination method, applied to a network side device, including:

sending a slot offset between the control channel and a data channel to a terminal through scheduling information carried by a control channel transmitted on a scheduling carrier;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Optionally, the method further includes:

sending configuration information to the terminal, where the configuration information includes the subcarrier spacing of the scheduling carrier and the subcarrier spacing of the scheduled carrier.

Optionally, the relative slot $K_{slot} = \lfloor ((2^{\mu_{scheduled}}/2^{\mu_{scheduling}}) \times S)/m \rfloor + K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l = \lfloor (2^{\mu_{scheduled}}/2^{\mu_{scheduling}}) \times n \rfloor + K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a terminal, including:

a receiving module, configured to receive scheduling information of a network side device carried by a control channel on a scheduling carrier, and obtaining a slot offset between the control channel and a data channel according to the scheduling information;

a first relative slot obtaining module, configured to determine a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

a first transmission slot obtaining module, configured to determine a transmission slot of the data channel on the scheduled carrier according to the relative slot.

Optionally, the first relative slot obtaining module includes:

a configuration information receiving unit, configured to receive configuration information sent by the network side device;

a subcarrier spacing obtaining unit, configured to obtain the subcarrier spacing of the scheduling carrier and the subcarrier spacing of the scheduled carrier according to the configuration information.

Optionally, the relative slot $K_{slot} = \lfloor ((2^{\mu_{scheduled}}/2^{\mu_{scheduling}}) \times S)/m \rfloor + K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the first transmission slot obtaining module includes:

a first scheduling slot obtaining unit, configured to obtain a slot where the control channel is transmitted on the scheduling carrier;

a first transmission slot obtaining unit, configured to determine the transmission slot according to the slot where the control channel is transmitted on the scheduling carrier, the subcarrier spacing of the scheduling carrier, the subcarrier spacing of the scheduled carrier and the relative slot.

Optionally, the transmission slot $l = \lfloor (2^{\mu_{scheduled}}/2^{\mu_{scheduling}}) \times n \rfloor + K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a network side device, including:

a first sending module, configured to send a slot offset between the control channel and a data channel to a terminal through scheduling information carried by a control channel transmitted on a scheduling carrier;

a second relative slot obtaining module, configured to determine a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

a second transmission slot obtaining module, configured to determine a transmission slot of the data channel on the scheduled carrier according to the relative slot.

Optionally, the network side device further includes:

a second sending module, configured to send configuration information to the terminal, where the configuration information includes the subcarrier spacing of the scheduling carrier and the subcarrier spacing of the scheduled carrier.

Optionally, the relative slot $K_{slot} = \lfloor ((2^{\mu_{scheduled}}/2^{\mu_{scheduling}}) \times S)/m \rfloor + K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the second transmission slot obtaining module includes:

a second scheduling slot obtaining unit, configured to obtain a slot where the control channel is transmitted on the scheduling carrier;

a second transmission slot obtaining unit, configured to determine the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor((2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a terminal, including: a transceiver, a memory, a processor, and a program stored on the memory and executable on the processor, when the processor executes the program, the following steps are implemented:

receiving scheduling information of a network side device carried by a control channel on a scheduling carrier, and obtaining a slot offset between the control channel and a data channel according to the scheduling information;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Optionally, the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, includes:

receiving configuration information sent by the network side device;

obtaining the subcarrier spacing of the scheduling carrier and the subcarrier spacing of the scheduled carrier according to the configuration information.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a network side device, including: a transceiver, a memory, a processor, and a program stored on the memory and executable on the processor, when the processor executes the program, the following steps are implemented:

sending a slot offset between the control channel and a data channel to a terminal through scheduling information carried by a control channel transmitted on a scheduling carrier;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Optionally, when the processor executes the program, the following steps are further implemented:

sending configuration information to the terminal, where the configuration information includes the subcarrier spacing of the scheduling carrier and the subcarrier spacing of the scheduled carrier.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

The embodiments of the present disclosure further provide a computer readable storage medium, and a computer program is stored in the computer readable storage medium, when the computer program is executed by a processor, the steps of the scheduling timing determination method on the terminal side provided by the embodiments of the present disclosure are implemented, or, when the computer program is executed by a processor, the steps of the scheduling timing determination method on the network side device side provided by the embodiments of the present disclosure are implemented.

In the embodiment of the present disclosure, when the transmission slot of the data channel on the scheduled carrier is determined, not only the subcarrier spacings of the scheduling carrier and the scheduled carrier and the slot offset between the control channel and the data channel carried in the DCI, but also the starting symbol of the control channel transmitted on the scheduling carrier in the slot are considered, so that the scheduling flexibility may be ensured and the complexity of the terminal may be reduced.

DETAILED DESCRIPTION

In order that objects, technical solutions, and advantages of the present disclosure become more apparent, a detailed description will be made as below in conjunction with the accompanying drawings and specific embodiments.

Figure 1:
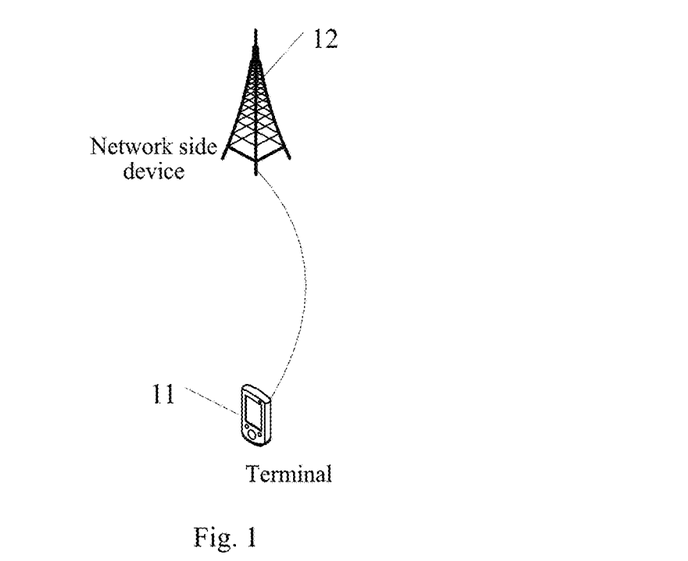
FIG. 1 is a schematic view of a network structure applicable to an embodiment of the present disclosure.

Referring to FIG. 1 which is a schematic view of a network structure applicable to the embodiments of the present disclosure, and as shown in FIG. 1, the network structure includes a terminal 11 and a network side device 12, where the terminal 11 may be a User Equipment (User Equipment, UE) or other terminal devices, for example: terminal side devices such as a Mobile phone, a Tablet Personal Computer (Tablet Personal Computer), a Laptop Computer (Laptop Computer), a Personal Digital Assistant (personal digital assistant, PDA for short), a Mobile Internet Device (Mobile Internet Device, MID for short), or a Wearable Device (Wearable Device), it should be noted that specific types of terminals are not limited in the embodiments of the present disclosure. The network side device 12 may be a base station, such as a macro station, a LTE Evolved Node B (Evolved Node B, eNB), a fifth generation ($5^{th}$ Generation, 5G) new radio (New Radio, NR) Node B (Node B, NB), etc. The network side device 12 may also be a micro station, such as a Low Power Node (LPN: low power node), a pico station, a femto station, etc., or the network side device 12 may be an Access Point (AP, access point). The base station may be a collection of network nodes including a Central Unit (CU) and a plurality of Transmission Reception Points (TRP, Transmission and Reception Point) which are managed and controlled by the Central Unit (CU, central unit). It should be noted that, in the embodiments of the present disclosure, the specific type of the network side device is not limited.

Figure 2:
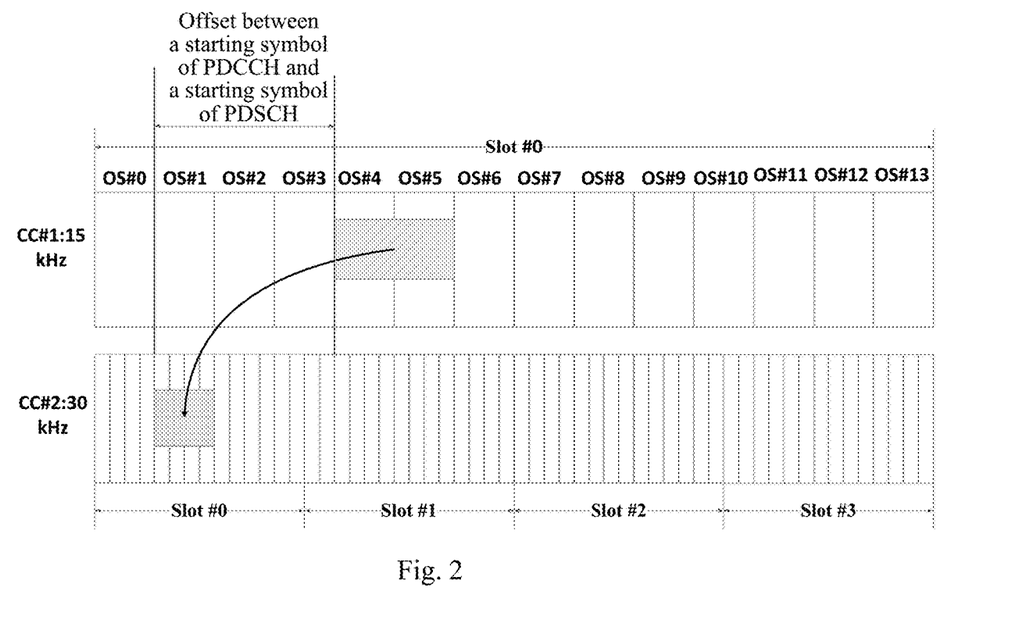
FIG. 2 is a schematic diagram of an example of scheduling timing determination in the related art.

When a scheduling carrier and a scheduled carrier have different subcarrier spacings, absolute durations of a slot on different carriers are different, that is, one slot on the scheduling carrier may include multiple or some of slots on the scheduled carrier. In addition, a time domain starting position of PDCCH (Physical Downlink Control Channel) transmission on the scheduling carrier can be flexibly configured. The current solution does not consider the impact of the starting position of PDCCH on timing, which may cause transmission of PDSCH (Physical Downlink Shared Channel) seriously ahead of transmission of the PDCCH. As a result, the requirements for terminal capabilities may be increased, and the delay may increase, thereby affecting scheduling flexibility. For example, as shown in FIG. 2, assuming that the scheduling carrier SCS (subcarrier spacing)=15 kHz, the scheduled carrier SCS=30 kHz, n=0 and $K_0$=0. It can be seen from a perspective of the scheduled carrier, a PDCCH transmitted in slot #1 (OS (OFDM (Orthogonal Frequency Division Multiplexing) symbol) #4 and OS #5 in slot #0 on the scheduling carrier correspond to OS #2 to OS #9 in slot #1 on the scheduled carrier (3rd symbol to 10th symbol)) schedules a PDSCH transmitted in slot #0.

Figure 3:
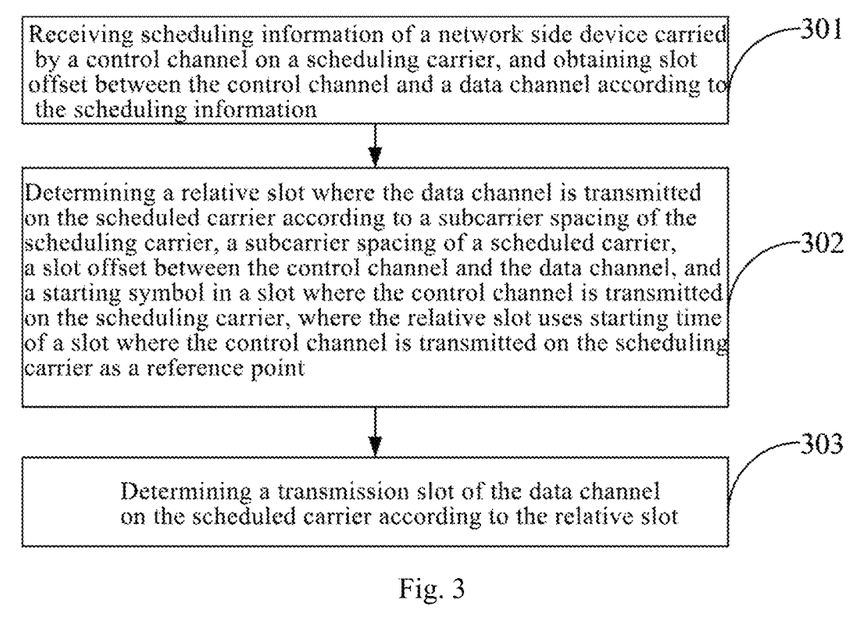
FIG. 3 is a flow chart of a scheduling timing determination method according to Embodiment I of the present disclosure.

Please refer to FIG. 3, FIG. 3 is a flowchart of a scheduling timing determination method according to an embodiment of the present disclosure, the method applied to a terminal and includes the following steps:

Step 301: receiving scheduling information of a network side device carried by a control channel on a scheduling carrier, and obtaining a slot offset between the control channel and a data channel according to the scheduling information;

Step 302: determining a relative slot where the data channel is transmitted on the scheduled carrier according to a subcarrier spacing of the scheduling carrier, a subcarrier spacing of the scheduled carrier, the slot offset between the control channel and the data channel, and a starting symbol in a slot where the control channel is transmitted on the scheduling carrier, where the relative slot uses a starting time of the slot where the control channel is transmitted on the scheduling carrier as a reference point;

Step 303: determining a transmission slot of the data channel on the scheduled carrier according to the relative slot.

The relative slot can also be understood as: taking the starting time of the slot where the control channel is transmitted on the scheduling carrier as a reference point, a slot offset of the data channel relative to the reference point on the scheduled carrier (in units of slots on the scheduled carrier).

It should be noted that, in the embodiments of the present disclosure, the above-mentioned control channel may be a PDCCH, but it is not limited thereto. In the embodiments of the present disclosure, the control channel may refer to various existing and future control channels that may be defined. The above-mentioned data channel may be a PDSCH or a PUSCH (Physical Uplink Shared Channel). Similarly, the data channel may also refer to various existing and future data channels that may be defined.

It should also be noted that the embodiments of the present disclosure does not limit the subcarrier spacings of the scheduling carrier and the scheduled carrier, that is, the subcarrier spacing of the scheduled carrier may be smaller than the subcarrier spacing of the scheduling carrier and may also be greater than the subcarrier spacing of the scheduling carrier. The slot and starting symbol of the control channel transmitted on the scheduling carrier are also not limited. The control channel may be transmitted on any slot on the scheduling carrier, and the starting symbol can also be any symbol in the slot.

In addition, if the data channel is PDSCH, the slot offset between the control channel and the data channel is $K_0$; if the data channel is PUSCH, then the slot offset between the control channel and the data channel indicated in the scheduling information is $K_2$.

In the embodiment of the present disclosure, when the transmission slot of the data channel on the scheduled carrier is determined, not only the subcarrier spacings of the scheduling carrier and the scheduled carrier and the slot offset between the control channel and the data channel carried in the DCI, but also the starting symbol of the control channel transmitted on the scheduling carrier in the slot are considered, so that the scheduling flexibility may be ensured and the complexity of the terminal may be reduced.

Optionally, the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, includes:

receiving configuration information sent by the network side device;

obtaining the subcarrier spacing of the scheduling carrier and the subcarrier spacing of the scheduled carrier according to the configuration information.

That is, the subcarrier spacing of the scheduling carrier and the subcarrier spacing of the scheduled carrier may be configured by the network side device, and the configuration information may directly carry values of the subcarrier spacing of the scheduling carrier and the subcarrier spacing of the scheduled carrier, and may also only carry a number of the subcarrier spacing or other identification information. In addition, the subcarrier spacing of the scheduling carrier and the subcarrier spacing of the scheduled carrier are not limited to be configured by the network side device, and may also obtained by the terminal in other ways, such as pre-appointment.

It should be noted that, in addition to the subcarrier spacing of the scheduling carrier and the subcarrier spacing of the scheduled carrier, the configuration information also includes the number of the scheduling carrier and the number of the scheduled carrier, so that the terminal clarifies which carrier is the scheduling carrier and the scheduled carrier, so as to receive scheduling information on a designated scheduling carrier, and switch to a designated scheduled carrier to send and receive data.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel ($K_0$ when the data channel is PDSCH, $K_0$ when the data channel is PUSCH), and m is the quantity of symbols within one slots in one slot. Values of $\mu_{scheduled}$ and $\mu_{scheduling}$ are integer values such as 0, 1, 2, 3, which correspond to the subcarrier spacing of 15 kHz, 30 kHz, 60 kHz, 120 kHz, etc. respectively.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

After determining the transmission slot of the data channel on the scheduled carrier according to the above method, the terminal performs data transmission and reception in the transmission slot on the scheduled carrier.

It should be noted that the embodiments of the present disclosure are not limited to an inter-carrier scheduling scenario, and are also applicable to a current carrier scheduling scenario.

Figure 4:
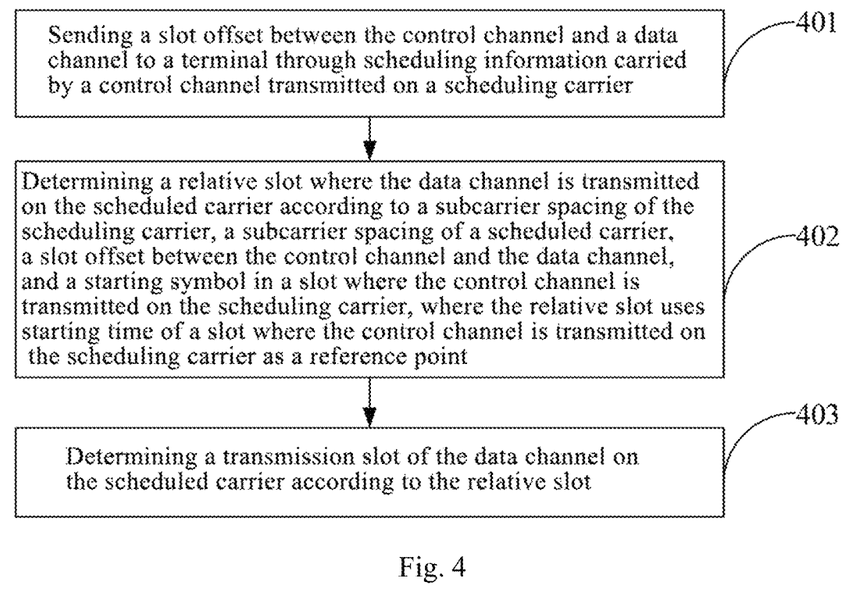
FIG. 4 is a flow chart of a scheduling timing determination method according to Embodiment II of the present disclosure.

Please refer to FIG. 4, FIG. 4 is a flowchart of a scheduling timing determination method according to an embodiment of the present disclosure, the method is applied to a network side device and includes the following steps:

Step 401: sending a slot offset between the control channel and a data channel to a terminal through scheduling information carried by a control channel transmitted on a scheduling carrier;

Step 402: determining a relative slot where the data channel is transmitted on the scheduled carrier according to a subcarrier spacing of the scheduling carrier, a subcarrier spacing of the scheduled carrier, the slot offset between the control channel and the data channel, and a starting symbol in a slot where the control channel is transmitted on the scheduling carrier, where the relative slot uses a starting time of the slot where the control channel is transmitted on the scheduling carrier as a reference point;

Step 403: determining a transmission slot of the data channel on the scheduled carrier according to the relative slot.

In the embodiment of the present disclosure, when the transmission slot of the data channel on the scheduled carrier is determined, not only the subcarrier spacings of the scheduling carrier and the scheduled carrier and the slot offset between the control channel and the data channel carried in the DCI, but also the starting symbol of the control channel transmitted on the scheduling carrier in the slot are considered, so that the scheduling flexibility may be ensured and the complexity of the terminal may be reduced.

Optionally, the method further includes:

sending configuration information to the terminal, where the configuration information includes the subcarrier spacing of the scheduling carrier and the subcarrier spacing of the scheduled carrier.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l = \lfloor (2^{\mu_{scheduled}}/2^{\mu_{scheduling}}) \times n \rfloor + K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

It should be noted that this embodiment is used as an implementation of the network side device corresponding to the foregoing Embodiment I. For specific implementations, please refer to the relevant description of the foregoing Embodiment I. In order to avoid repetitive description, it is not repeated in this embodiment, and the same beneficial effects may also be achieved.

Figure 5:
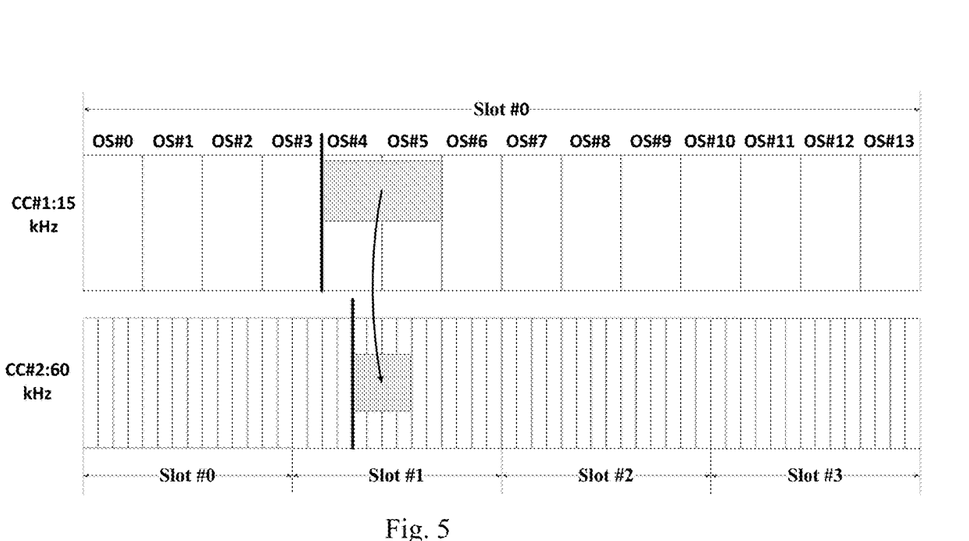
FIG. 5 is a schematic view of a scheduling timing determination method according to Embodiment III of the present disclosure.

Embodiment III of the present disclosure provides a scheduling timing determination method. As shown in FIG. 5, it is assumed that the carrier spacing of the scheduling carrier CC #1 is 15 kHz, and the subcarrier spacing of the scheduled carrier CC #2 is 60 kHz. The base station (i.e., the network side device) schedules PDSCH transmission on CC #2 through the PDCCH transmitted on CC #1. It is assumed that time-domain resource indication information for the time-domain resource allocation carried in the DCI is as follows:

$K_0 = 0$;

The starting symbol position of the PDSCH in the slot is the fourth OFDM symbol;

The time domain duration occupied by PDSCH transmission in the slot is L=4 OFDM symbols.

Further, the terminal detects that time domain starting position of a received PDCCH is the fourth symbol in slot #0 on CC #1, that is S=4, the quantity of symbols within one slots in one slot m=14. Then the index of the relative slot of the PDSCH transmitted on the scheduled carrier is:

$K_{slot} = \lfloor ((2^{\mu_{scheduled}}/2^{\mu_{scheduling}}) \times S)/14 \rfloor + K_{indicated} = \lfloor ((2^2/2^0) \times 4)/14 \rfloor + 0 = 1$ The relative slot is a slot index (slot index) calculated by taking a boundary of slot #0 on CC #1 as a reference point (that is, the starting time), that is, the PDSCH on the scheduled carrier CC #2 scheduled by the DCI is transmitted in relative slot #1.

Figure 6:
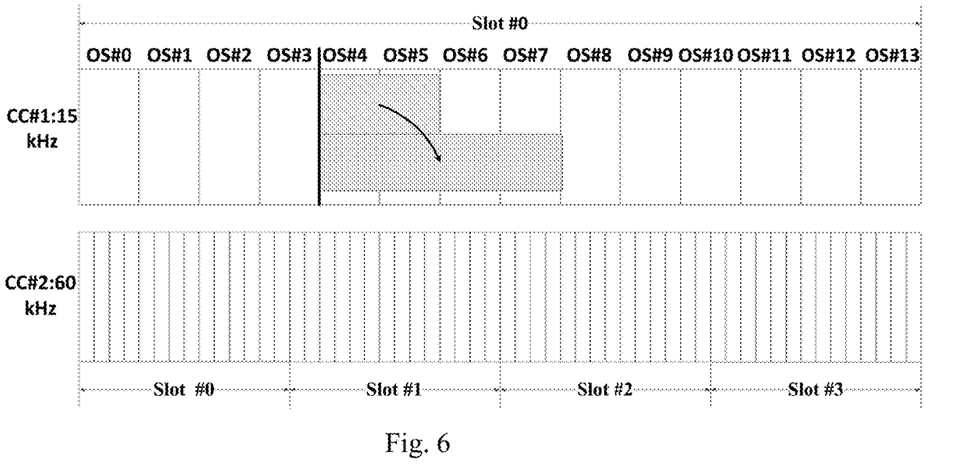
FIG. 6 is a schematic view of a scheduling timing determination method according to Embodiment IV of the present disclosure.

Embodiment IV of the present disclosure provides a scheduling timing determination method. As shown in FIG. 6, the difference between this embodiment of the present disclosure and the foregoing Embodiment III is that it is not inter-carrier scheduling but current carrier scheduling, that is, it is assumed that the carrier spacing of the scheduling carrier CC #1 is 15 kHz, and the subcarrier spacing of the scheduled carrier CC #2 is also 15 kHz. The relative slot index of the PDSCH transmitted on the scheduled carrier is:

$K_{slot} = \lfloor ((2^{\mu_{scheduled}}/2^{\mu_{scheduling}}) \times S)/14 \rfloor + K_{indicated} = \lfloor ((2^0/2^0) \times 4)/14 \rfloor + 0 = 0$ That is, the PDSCH on the scheduled carrier CC #1 scheduled by the DCI is transmitted in the relative slot #0.

Embodiment V of the present disclosure provides a scheduling timing determination method. It is assumed that the carrier spacing of the scheduling carrier CC #1 is 60 kHz, and the subcarrier spacing of the scheduled carrier CC #2 is 15 kHz. The base station schedules PDSCH transmission on CC #2 through the PDCCH transmitted on CC #1. It is assumed that time-domain resource indication information for the time-domain resource allocation carried in the DCI is as follows:

$K0 = 0$.

The starting symbol position of the PDSCH in the slot is the fourth OFDM symbol;

The time domain duration occupied by PDSCH transmission in the slot is L=4 OFDM symbols.

Further, the terminal detects that time domain starting position of a received PDCCH is the fourth symbol in slot #0 on CC #1, that is S=4. Then the relative slot index of the PDSCH transmitted on the scheduled carrier is:

$K_{slot} = \lfloor ((2^{\mu_{scheduled}}/2^{\mu_{scheduling}}) \times S)/14 \rfloor + K_{indicated} = \lfloor ((2^0/2^0) \times 4)/14 \rfloor + 0 = 0$ The relative slot is a slot index calculated by taking a boundary of slot #0 on CC #1 as a reference point (the starting time), that is, the PDSCH on the scheduled carrier CC #2 scheduled by the DCI is transmitted in relative slot #0.

Figure 7:
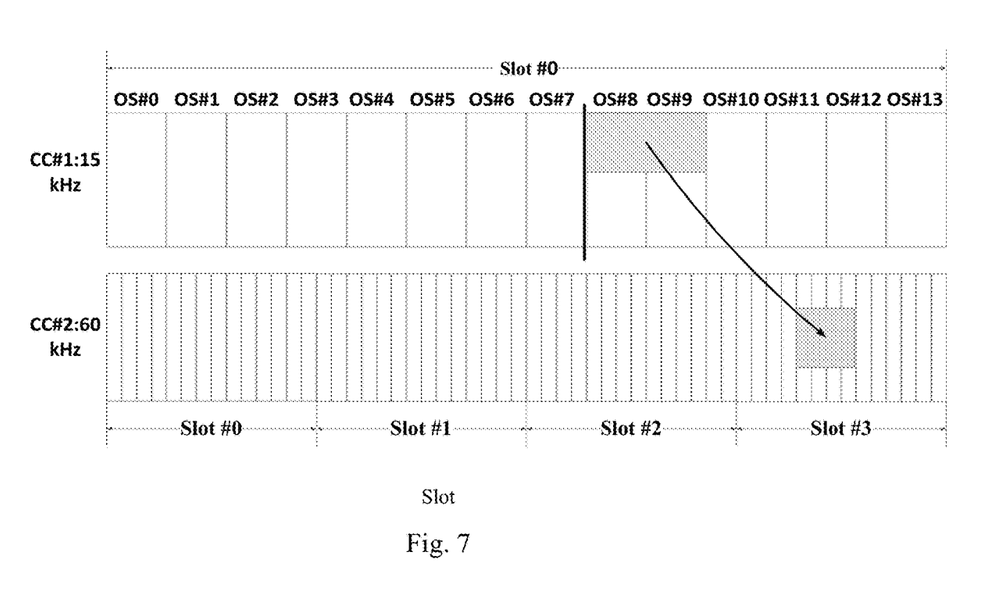
FIG. 7 is a schematic view of a scheduling timing determination method according to Embodiment VI of the present disclosure.

Embodiment VI of the present disclosure provides a scheduling timing determination method. As shown in FIG. 7, it is assumed that the carrier spacing of the scheduling carrier CC #1 is 15 kHz, and the subcarrier spacing of the scheduled carrier CC #2 is 30 kHz. The base station schedules PUSCH transmission on CC #2 through the PDCCH transmitted on CC #1. It is assumed that time-domain resource indication information for the time-domain resource allocation carried in the DCI is as follows:

$K_2 = 1$

The starting symbol position of the PUSCH in the slot is the fourth OFDM symbol;

The time domain duration occupied by PUSCH transmission in the slot is L=4 OFDM symbols Further, the terminal detects that time domain starting position of a received PDCCH is the eighth symbol in slot #0 on CC #1, that is S=8. Then the relative slot index of the PDSCH transmitted on the scheduled carrier is:

$K_{slot} = \lfloor ((2^{\mu_{scheduled}}/2^{\mu_{scheduling}}) \times S)/14 \rfloor + K_{indicated} = \lfloor ((2^2/2^0) \times 8)/14 \rfloor + 1 = 3$ That is the PUSCH on the scheduled carrier CC #1 scheduled by the DCI is transmitted in the relative slot #3.

Figure 8:
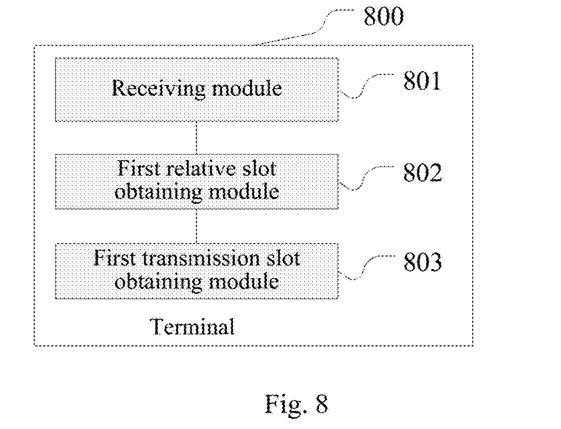
FIG. 8 is a schematic diagram of a terminal according to Embodiment VII of the present disclosure.

Please refer to FIG. 8, FIG. 8 is a schematic diagram of a terminal according to Embodiment VII of the present disclosure, the terminal 800 includes:

a receiving module 801, configured to receive scheduling information of a network side device carried by a control channel on a scheduling carrier, and obtaining a slot offset between the control channel and a data channel according to the scheduling information;

a first relative slot obtaining module 802, configured to determine a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

a first transmission slot obtaining module 803, configured to determine a transmission slot of the data channel on the scheduled carrier according to the relative slot.

Optionally, the first relative slot obtaining module includes:

a configuration information receiving unit, configured to receive configuration information sent by the network side device;

a subcarrier spacing obtaining unit, configured to obtain the subcarrier spacing of the scheduling carrier and the subcarrier spacing of the scheduled carrier according to the configuration information.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the first transmission slot obtaining module includes:

a first scheduling slot obtaining unit, configured to obtain a slot where the control channel is transmitted on the scheduling carrier;

a first transmission slot obtaining unit, configured to determine the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

It should be noted that the above-mentioned terminal 800 in this embodiment may be a terminal in any implementation in the method embodiments of the embodiments of the disclosure, and any implementation of the terminal in the method embodiments of the embodiments of the disclosure may be realized by the above-mentioned terminal 800 and achieves the same beneficial effects, and will not be repeated here.

Figure 9:
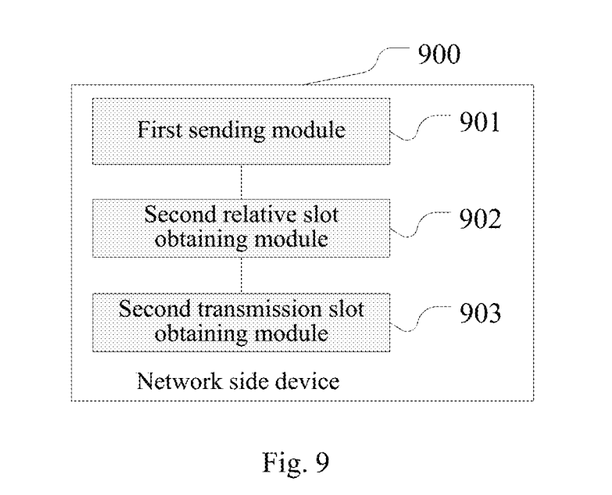
FIG. 9 is a schematic diagram of a network side device according to Embodiment VIII of the present disclosure.

Please refer to FIG. 9, FIG. 9 is a schematic diagram of a network side device according to Embodiment VIII of the present disclosure, the network side device 900 includes:

a first sending module 901, configured to send a slot offset between the control channel and a data channel to a terminal through scheduling information carried by a control channel transmitted on a scheduling carrier;

a second relative slot obtaining module 902, configured to determine a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

a second transmission slot obtaining module 903, configured to determine a transmission slot of the data channel on the scheduled carrier according to the relative slot.

Optionally, the network side device 900 further includes:

a second sending module, configured to send configuration information to the terminal, where the configuration information includes the subcarrier spacing of the scheduling carrier and the subcarrier spacing of the scheduled carrier.

Optionally, the relative slot $K_{slot}=\lfloor((2^{\mu_{scheduled}}/2^{\mu_{scheduling}})\times S)/m\rfloor+K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the second transmission slot obtaining module includes:

a second scheduling slot obtaining unit, configured to obtain a slot where the control channel is transmitted on the scheduling carrier;

a second transmission slot obtaining unit, configured to determine the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor(2^{\mu_{scheduled}}/2^{\mu_{scheduling}})\times n\rfloor+K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

It should be noted that the above-mentioned network side device 900 in this embodiment may be a network side device in any implementation in the method embodiments of the embodiments of the disclosure, and any implementation of the network side device in the method embodiments of the embodiments of the disclosure may be realized by the above-mentioned network side device 900 and achieves the same beneficial effects, and will not be repeated here.

Figure 10:
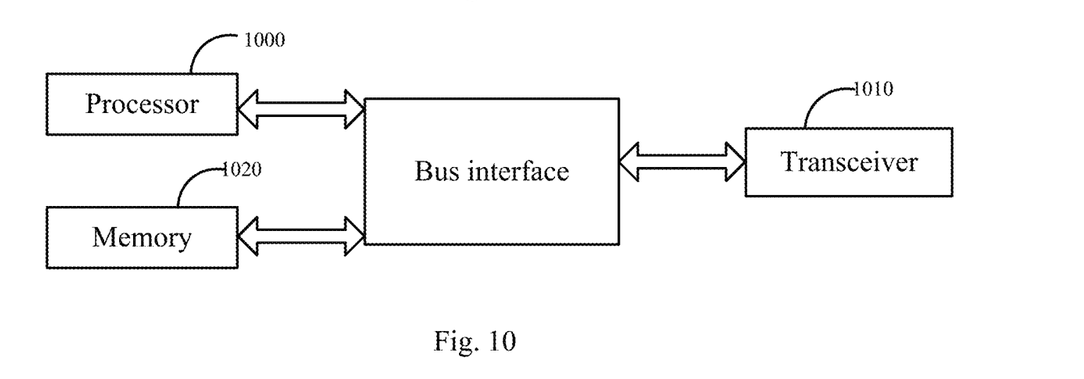
FIG. 10 is a schematic diagram of a terminal according to Embodiment IX of the present disclosure.

Please refer to FIG. 10, FIG. 10 is a schematic diagram of another terminal according to Embodiment IX of the present disclosure, the terminal includes: a transceiver 1010, a memory 1020, a processor 1000, and a program stored on the memory 1020 and executable on the processor, when the processor executes the program, the following steps are implemented:

receiving scheduling information of a network side device carried by a control channel on a scheduling carrier, and obtaining a slot offset between the control channel and a data channel according to the scheduling information;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Where the transceiver 1010 may be used for signal reception and transmission under control of the processor 1000.

In FIG. 10, a bus architecture may include any quantity of interconnected buses and bridges, which are specifically connected together by various circuits of one or more processors represented by the processor 1000 and a memory represented by the memory 1020. The bus architecture may further connect together various other circuits of a peripheral device, a voltage stabilizer, a power management circuit, and the like, which are known in this art and will not be further described herein. The bus interface provides an interface. The transceiver 1010 can include a plurality of elements, namely a transmitter and a receiver, providing units in communication with various other devices on the transmission medium.

The processor 1000 is responsible for management of the bus architecture and general processing. The memory 1020 may store data used by the processor 1000 when operations are performed.

It should be noted that the memory 1020 is not limited to being only on the terminal, and the memory 1020 and the processor 1000 may be separated in different geographic locations.

Optionally, the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, includes:

receiving configuration information sent by the network side device;

obtaining the subcarrier spacing of the scheduling carrier and the subcarrier spacing of the scheduled carrier according to the configuration information.

Optionally, the relative slot $K_{slot} = \lfloor ((2^{\mu_{scheduled}}/2^{\mu_{scheduling}}) \times S)/m \rfloor + K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l = \lfloor (2^{\mu_{scheduled}}/2^{\mu_{scheduling}}) \times n \rfloor + K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

It should be noted that the above-mentioned terminal in this embodiment may be a terminal in any implementation in the method embodiments of the embodiments of the disclosure, and any implementation of the terminal in the method embodiments of the embodiments of the disclosure may be realized by the above-mentioned terminal and achieves the same beneficial effects, and will not be repeated here.

Figure 11:
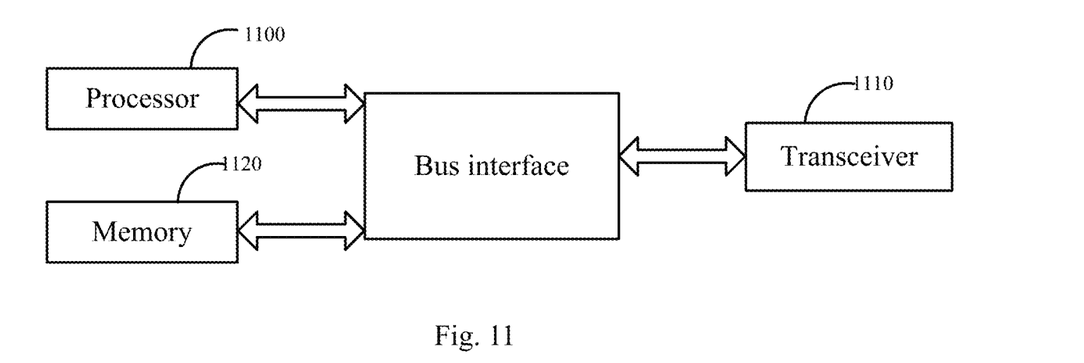
FIG. 11 is a schematic diagram of a network side device according to Embodiment X of the present disclosure.

Please refer to FIG. 11, FIG. 11 is another schematic diagram of a network side device according to Embodiment X of the present disclosure, and the network side device includes: a transceiver 1110, a memory 1120, a processor 1100, and a program stored on the memory 1120 and executable on the processor 1100, when the processor 1100 executes the program, the following steps are implemented:

sending a slot offset between the control channel and a data channel to a terminal through scheduling information carried by a control channel transmitted on a scheduling carrier;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, where the relative slot uses a starting time of the slot where the control channel is transmitted on the scheduling carrier as a reference point;

determining a transmission slot of the data channel on the scheduled carrier according to the relative slot.

Where the transceiver 1110 may be used for signal reception and transmission under control of the processor 1100.

In FIG. 11, a bus architecture may include any quantity of interconnected buses and bridges, which are specifically connected together by various circuits of one or more processors represented by the processor 1100 and a memory represented by the memory 1120. The bus architecture may further connect together various other circuits of a peripheral device, a voltage stabilizer, a power management circuit, and the like, which are known in this art and will not be further described herein. The bus interface provides an interface. The transceiver 1110 can include a plurality of elements, namely a transmitter and a receiver, providing units in communication with various other devices on the transmission medium.

The processor 1100 is responsible for management of the bus architecture and general processing. The memory 1120 may store data used by the processor 1100 when operations are performed.

It should be noted that the memory 1120 is not limited to being only on the network side device, and the memory 1120 and the processor 1100 may be separated in different geographic locations.

Optionally, when the processor 1100 executes the program, the following steps are further implemented:

sending configuration information to the terminal, where the configuration information includes the subcarrier spacing of the scheduling carrier and the subcarrier spacing of the scheduled carrier.

Optionally, the relative slot $K_{slot} = \lfloor ((2^{\mu_{scheduled}}/2^{\mu_{scheduling}}) \times S)/m \rfloor + K_{indicated}$, where, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

Optionally, the step of determining a transmission slot of the data channel on the scheduled carrier according to the relative slot includes:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

Optionally, the transmission slot $l=\lfloor (2^{\mu_{scheduled}}/2^{\mu_{scheduling}}) \times n \rfloor + K_{slot}$, Where, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

It should be noted that the above-mentioned network side device in this embodiment may be a network side device in any implementation in the method embodiments of the embodiments of the disclosure, and any implementation of the network side device in the method embodiments of the embodiments of the disclosure may be realized by the above-mentioned network side device and achieves the same beneficial effects, and will not be repeated here.

The embodiments of the present disclosure further provide a computer readable storage medium, where a computer program is stored in the computer readable storage medium, when the computer program is executed by a processor, steps of the scheduling timing determination method according to any one of the above Embodiment I to Embodiment VI are implemented.

In the several embodiments provided in the present disclosure, it should be understood that the disclosed method and apparatus may be implemented in other manners. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each of the units may exist alone physically, or two or more units are integrated into one unit. The integrated unit may be implemented in a form of hardware, or may also be implemented in a form of hardware plus a software functional unit.

The above integrated unit implemented in the form of a software functional unit may be stored in a computer readable storage medium. The above software functional unit is stored in a storage medium and includes several instructions so that a computer device (which may be a personal computer, a server, or a network device, etc.) to perform some steps of the methods described in various embodiments of the present disclosure. The foregoing storage medium includes various media capable of storing program codes, such as a USB flash drive, a mobile hard disk, a read-only memory (Read-Only Memory, ROM), a random access memory (Random Access Memory, RAM), a magnetic disk, or an optical disc.

It should be appreciated that, the embodiments of the present disclosure may be implemented by hardware, software, firmware, middleware, microcode or a combination thereof. For hardware implementation, the modules, units, sub-units or sub-modules may be implemented in one or more Application Specific Integrated Circuits (Application Specific Integrated Circuits, ASIC), a Digital Signal Processor (Digital Signal Processing, DSP), a Digital Signal Processing Device (DSP Device, DSPD), a Programmable Logic Device (Programmable Logic Device, PLD), a Field-Programmable Gate Array (Field-Programmable Gate Array, FPGA), a general-purpose processor, a controller, a microcontroller, a microprocessor, another electronic unit for performing the functions described in this application, or a combination thereof.

For software implementation, the technology described herein may be implemented by modules (for example, procedures and functions) of the functions described herein. The software code may be stored in the memory and executed by the processor. The memory may be implemented inside or outside the processor.

In the specification and claims of this application, the terms such as "first" and "second" are intended to distinguish between similar objects but do not necessarily indicate a specific order or sequence. It should be understood that the data termed in such a manner are interchangeable in proper cases so that the embodiments of this application can be implemented in other orders than the order illustrated or described in this application. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The foregoing descriptions are merely optional implementations of the present disclosure. It should be noted that a person of ordinary skill in the art may make several improvements or polishing without departing from the principle of this disclosure and the improvements and polishing shall fall within the protection scope of the present disclosure.

What is claimed is:

1. A scheduling timing determination method, applied to a terminal, comprising:

receiving scheduling information from a network side device carried in a control channel on a scheduling carrier, and obtaining a slot offset between the control channel and a data channel according to the scheduling information;

determining a relative slot where the data channel is transmitted on a scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, wherein the relative slot uses a starting time of the slot where the control channel is transmitted on the scheduling carrier as a reference point;

determining a transmission slot of the data channel on the scheduled carrier according to the relative slot.

2. The scheduling timing determination method according to claim 1, wherein, the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, comprises:

receiving configuration information sent by the network side device;

obtaining the subcarrier spacing of the scheduling carrier and the subcarrier spacing of the scheduled carrier according to the configuration information.

3. The scheduling timing determination method according to claim 1, wherein, the relative slot $K_{slot}=\lfloor((2^{\mu_{scheduled}}/2^{\mu_{scheduling}})\times S)/m\rfloor+K_{indicated}$, wherein, $\mu_{scheduled}$ is a index of the subcarrier spacing of the scheduled carrier, $\mu_{scheduling}$ is a index of the subcarrier spacing of the scheduling carrier, S is a index of the starting symbol of the control channel transmitted in the slot on the scheduling carrier, $K_{indicated}$ is the slot offset value between the control channel and the data channel, and m is the quantity of symbols within one slot.

4. The scheduling timing determination method according to claim 1, wherein, the step of determining a transmission slot of the data channel on the scheduled carrier according to the relative slot comprises:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

5. The scheduling timing determination method according to claim 4, wherein, the transmission slot $l=\lfloor(2^{\mu_{scheduled}}/2^{\mu_{scheduling}})\times n\rfloor+K_{slot}$, wherein, $\mu_{scheduled}$ is a index of the subcarrier spacing of the scheduled carrier, $\mu_{scheduling}$ is a index of the subcarrier spacing of the scheduling carrier, n is an index of the slot where the control channel is transmitted on the scheduling carrier, $K_{slot}$ is the relative slot.

6. A scheduling timing determination method, applied to a network side device, comprising:

sending a slot offset between the control channel and a data channel to a terminal through scheduling information carried by a control channel transmitted on a scheduling carrier;

determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, wherein the relative slot uses a starting time of the slot where the control channel is transmitted on the scheduling carrier as a reference point;

determining a transmission slot of the data channel on the scheduled carrier according to the relative slot.

7. The scheduling timing determination method according to claim 6, further comprising:

sending configuration information to the terminal, wherein the configuration information comprises the subcarrier spacing of the scheduling carrier and the subcarrier spacing of the scheduled carrier.

8. The scheduling timing determination method according to claim 6, wherein, the relative slot $K_{slot}=\lfloor((2^{\mu_{scheduled}}/2^{\mu_{scheduling}})\times S)/m\rfloor+K_{indicated}$, wherein, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

9. The scheduling timing determination method according to claim 6, wherein, the step of determining a transmission slot of the data channel on the scheduled carrier according to the relative slot comprises:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

10. The scheduling timing determination method according to claim 9, wherein, the transmission slot $l=\lfloor(2^{\mu_{scheduled}}/2^{\mu_{scheduling}})\times n\rfloor+K_{slot}$, wherein, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

11. A network side device, comprising: a transceiver, a memory, a processor, and a program stored on the memory and executable on the first processor, when the processor executes the program, the steps of the scheduling timing determination method according to claim 6 are implemented.

12. The network side device according to claim 11, wherein, when the processor executes the program, the following steps are further implemented:

sending configuration information to the terminal, wherein the configuration information comprises the subcarrier spacing of the scheduling carrier and the subcarrier spacing of the scheduled carrier.

13. The network side device according to claim 11, wherein, the relative slot $K_{slot}=\lfloor((2^{\mu_{scheduled}}/2^{\mu_{scheduling}})\times S)/m\rfloor+K_{indicated}$, wherein, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

14. The network side device according to claim 11, wherein:

the step of determining a transmission slot of the data channel on the scheduled carrier according to the relative slot comprises:

obtaining a slot where the control channel is transmitted on the scheduling carrier;

determining the transmission slot according to the slot where the control channel is transmitted on the scheduling carrier, the subcarrier spacing of the scheduling carrier, the subcarrier spacing of the scheduled carrier and the relative slot.

15. The network side device according to claim 14, wherein, the transmission slot $l=\lfloor(2^{\mu_{scheduled}}/2^{\mu_{scheduling}})\times n\rfloor+K_{slot}$, wherein, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

16. A terminal, comprising: a transceiver, a memory, a processor, and a program stored on the memory and executable on the first processor, when the processor executes the program, the following steps are implemented:
- receiving scheduling information of a network side device carried by a control channel on a scheduling carrier, and obtaining a slot offset between the control channel and a data channel according to the scheduling information;
- determining a relative slot where the data channel is transmitted on the scheduled carrier according to a subcarrier spacing of the scheduling carrier, a subcarrier spacing of the scheduled carrier, the slot offset between the control channel and the data channel, and a starting symbol of the control channel transmitted in a slot on the scheduling carrier, wherein the relative slot uses a starting time of the slot where the control channel is transmitted on the scheduling carrier as a reference point;
- determining a transmission slot of the data channel on the scheduled carrier according to the relative slot.

17. The terminal according to claim 16, wherein,
the determining a relative slot where the data channel is transmitted on the scheduled carrier according to a subcarrier spacing of the scheduling carrier, a subcarrier spacing of the scheduled carrier, the slot offset between the control channel and the data channel, and the starting symbol, comprises:
- receiving configuration information sent by the network side device;
- obtaining the subcarrier spacing of the scheduling carrier and the subcarrier spacing of the scheduled carrier according to the configuration information.

18. The terminal according to claim 16, wherein, the relative slot $K_{slot}=\lfloor((2^{\mu_{scheduled}}/2^{\mu_{scheduling}})\times S)/m\rfloor+K_{indicated}$,
wherein, $\mu_{scheduled}$ is an index of the subcarrier spacing of the scheduled carrier, $\mu_{scheduling}$ is an index of the subcarrier spacing of the scheduling carrier, S is an index of the starting symbol of the control channel transmitted on the scheduling carrier in the slot, $K_{indicated}$ is the slot offset value between the control channel and the data channel, and m is the quantity of symbols within one slots in one slot.

19. The terminal according to claim 16, wherein,
the step of determining a transmission slot of the data channel on the scheduled carrier according to the relative slot comprises:
obtaining a slot where the control channel is transmitted on the scheduling carrier;
determining the transmission slot according to the slot where the control channel is transmitted on the scheduling carrier, the subcarrier spacing of the scheduling carrier, the subcarrier spacing of the scheduled carrier and the relative slot.

20. The terminal according to claim 19, wherein, the transmission slot $l=\lfloor(2^{\mu_{scheduled}}/2^{\mu_{scheduling}})\times n\rfloor+K_{slot}$,
wherein, $\mu_{scheduled}$ is an index of the subcarrier spacing of the scheduled carrier, $\mu_{scheduling}$ is an index of the subcarrier spacing of the scheduling carrier, n is an index of the slot where the control channel is transmitted on the scheduling carrier, $K_{slot}$ is the relative slot.

* * * * *